US012479072B2

(12) United States Patent
Cera et al.

(10) Patent No.: US 12,479,072 B2
(45) Date of Patent: Nov. 25, 2025

(54) SCREW-IN AID FOR SCREWING IN A LONG SCREW

(71) Applicant: WÜRTH INTERNATIONAL AG, Chur (CH)

(72) Inventors: Udo Cera, Schwäbisch Hall (DE); Lukas Wildhagen, Waiblingen (DE)

(73) Assignee: WURTH INTERNATIONAL AG, Chur (CH)

( * ) Notice: Subject to any disclaimer, the term of this patent is extended or adjusted under 35 U.S.C. 154(b) by 381 days.

(21) Appl. No.: 17/628,525

(22) PCT Filed: Jul. 21, 2020

(86) PCT No.: PCT/EP2020/070513
§ 371 (c)(1),
(2) Date: Jan. 19, 2022

(87) PCT Pub. No.: WO2021/013818
PCT Pub. Date: Jan. 28, 2021

(65) Prior Publication Data
US 2022/0274234 A1    Sep. 1, 2022

(30) Foreign Application Priority Data
Jul. 23, 2019   (DE) ............... 10 2019 119 845.3

(51) Int. Cl.
B25B 23/00        (2006.01)
B25B 23/08        (2006.01)
(52) U.S. Cl.
CPC ............ *B25B 23/005* (2013.01); *B25B 23/08* (2013.01)

(58) Field of Classification Search
CPC ....... B25B 23/005; B25B 23/08; B25B 23/10; B25C 3/006; B25C 3/008; B23B 47/287;
(Continued)

(56) References Cited

U.S. PATENT DOCUMENTS 2,648,066 A * 8/1953 Ingraham ............... B25C 3/008
                                                        81/44
2,716,750 A * 9/1955 Biblis .................... B25C 3/008
                                                        81/44

(Continued)

FOREIGN PATENT DOCUMENTS

DE    20 2008 001 299 U1    3/2008
DE    10 2016 014 860 B3    3/2018
DE       102017119820 A1 *  2/2019    ............. B25B 23/08

OTHER PUBLICATIONS

International Search Report and Written Opinion of PCT/EP2020/070513, Oct. 23, 2020, 13 pages.
(Continued)

Primary Examiner — Bryan R Muller
(74) Attorney, Agent, or Firm — Womble Bond Dickinson (US) LLP

(57) ABSTRACT

Screw-in aid for screwing a long screw in a defined screw-in angle in an underground, with at least one ground engaging portion for placing at the underground and at least one screw placing portion for placing the screw on it, wherein the screw-in angle is formed between them, characterized in that at the screw placing portion, a screw holder is, in particular detachably, arranged, which forms a, in particular circumferentially closed, screwing channel for the screw between them, to guide the screw when screwing into the underground.

10 Claims, 12 Drawing Sheets

Figure 3A:
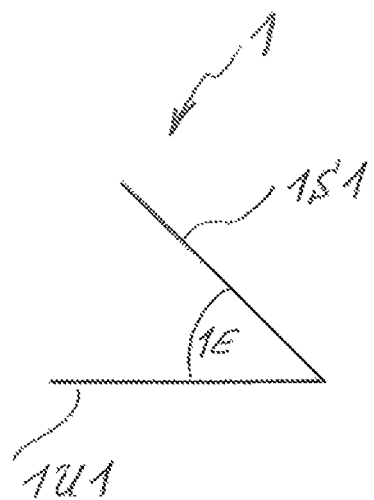

(58) Field of Classification Search
CPC .. B23B 2247/12; B23B 2247/10; B23B 47/28
See application file for complete search history.

(56) References Cited

U.S. PATENT DOCUMENTS

| | | | | |
|---|---|---|---|---|
| 3,316,949 | A | 5/1967 | Canfield | |
| 4,037,632 | A * | 7/1977 | Arena | B25C 3/008 227/147 |
| 4,951,532 | A * | 8/1990 | Nelson | B25C 3/008 81/44 |
| 5,740,705 | A * | 4/1998 | Graham | B25B 23/04 81/433 |
| 10,022,808 | B2 * | 7/2018 | Chang | B23B 47/287 |
| 10,399,152 | B2 * | 9/2019 | Chang | B23B 47/287 |
| 10,967,440 | B2 * | 4/2021 | Hill | B23B 47/28 |
| 2013/0276589 | A1 | 10/2013 | Vandenberg | |
| 2014/0260814 | A1 * | 9/2014 | Bullard | B25C 3/008 81/44 |
| 2018/0161966 | A1 * | 6/2018 | Rensburg | B25B 5/003 |

OTHER PUBLICATIONS

German Search Report of 10 2019 119 845.3, Mar. 20, 2020, 8 pages.

* cited by examiner

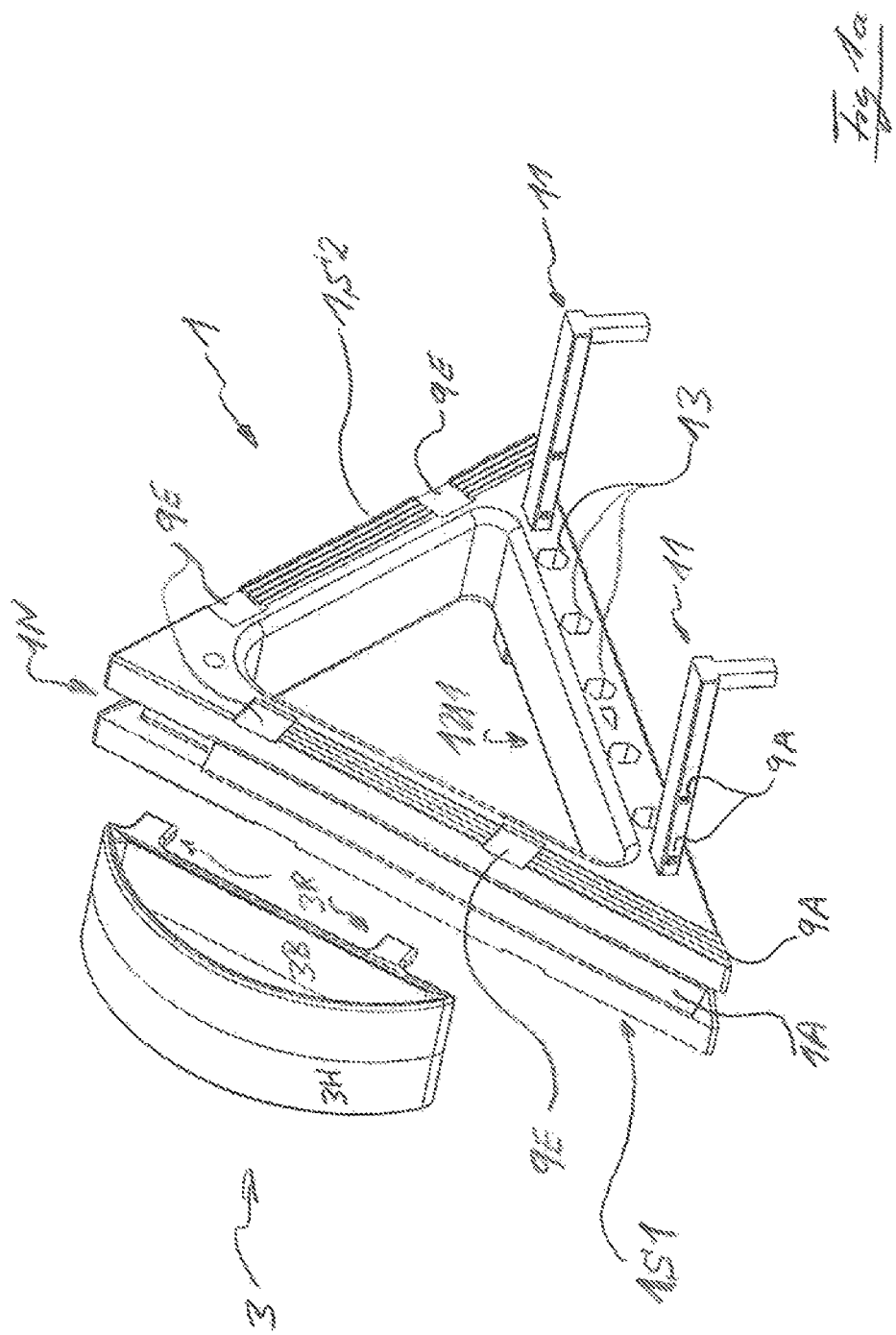

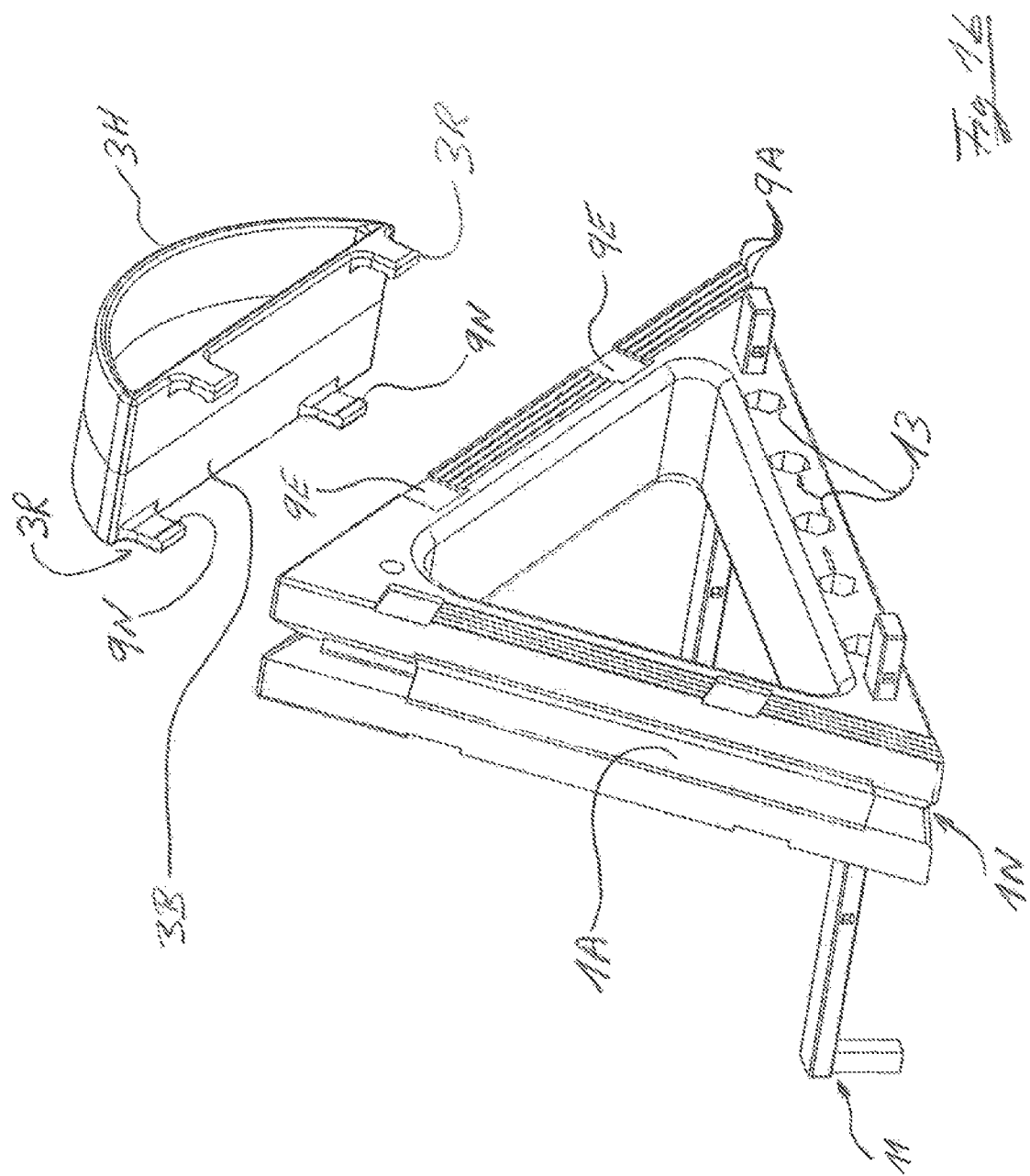

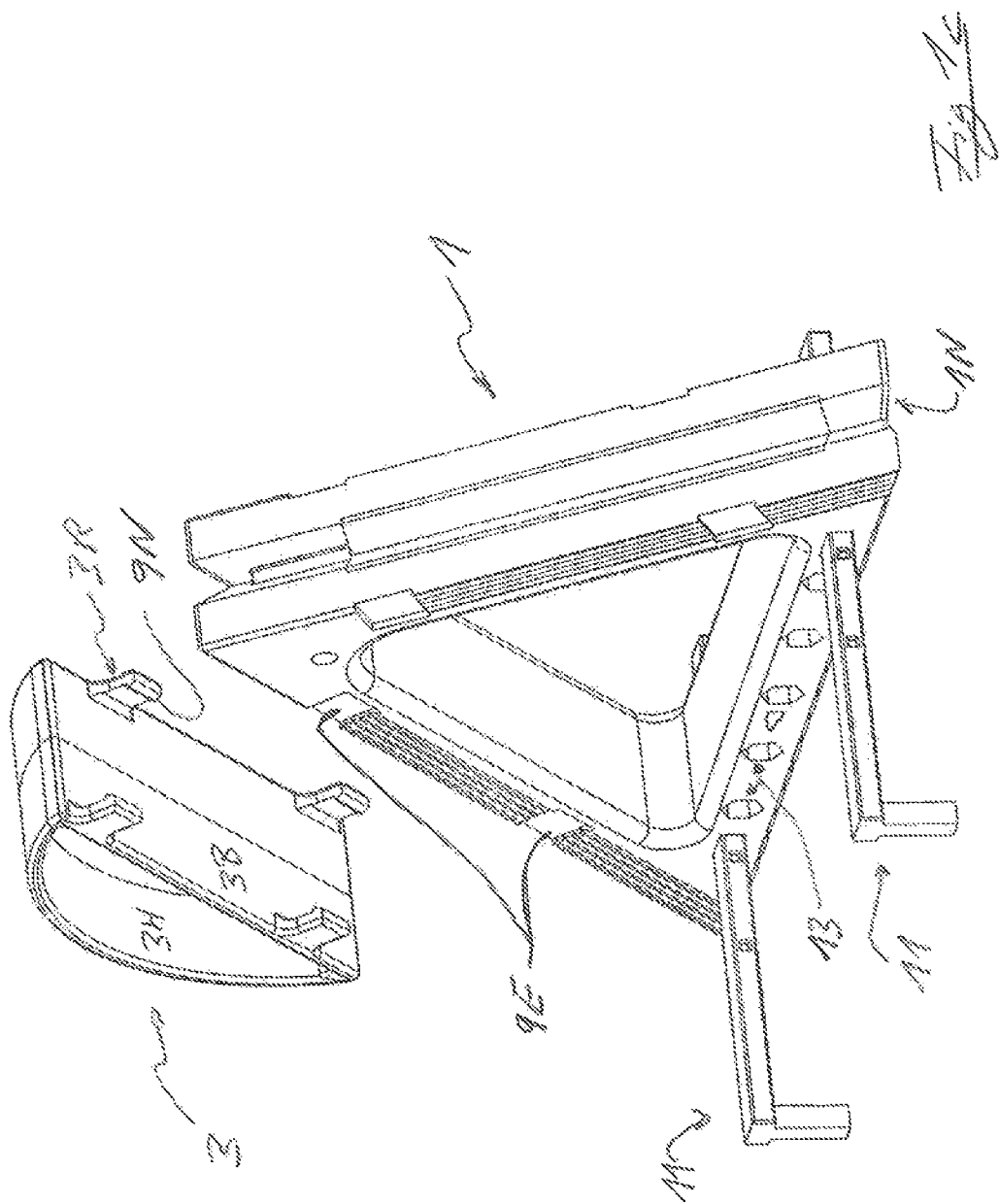

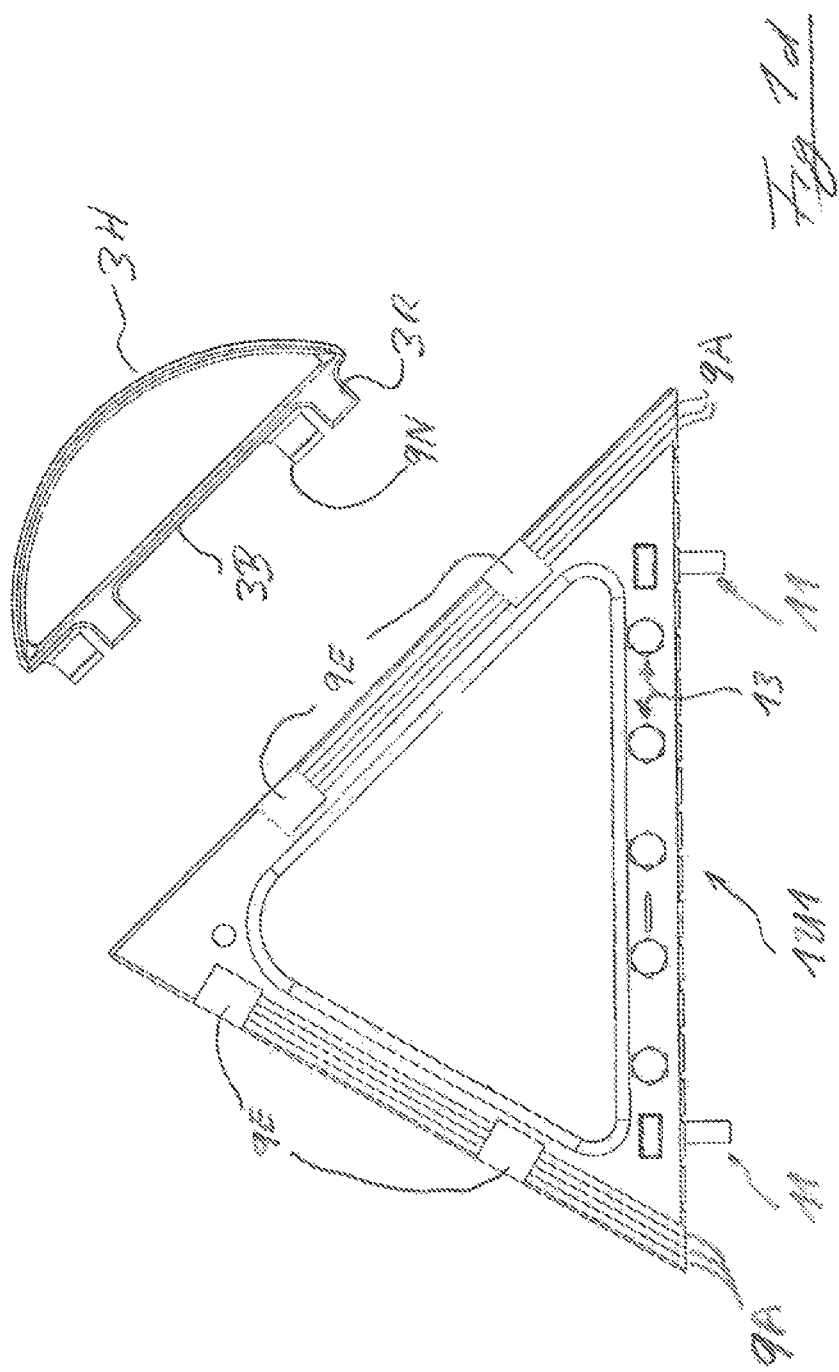

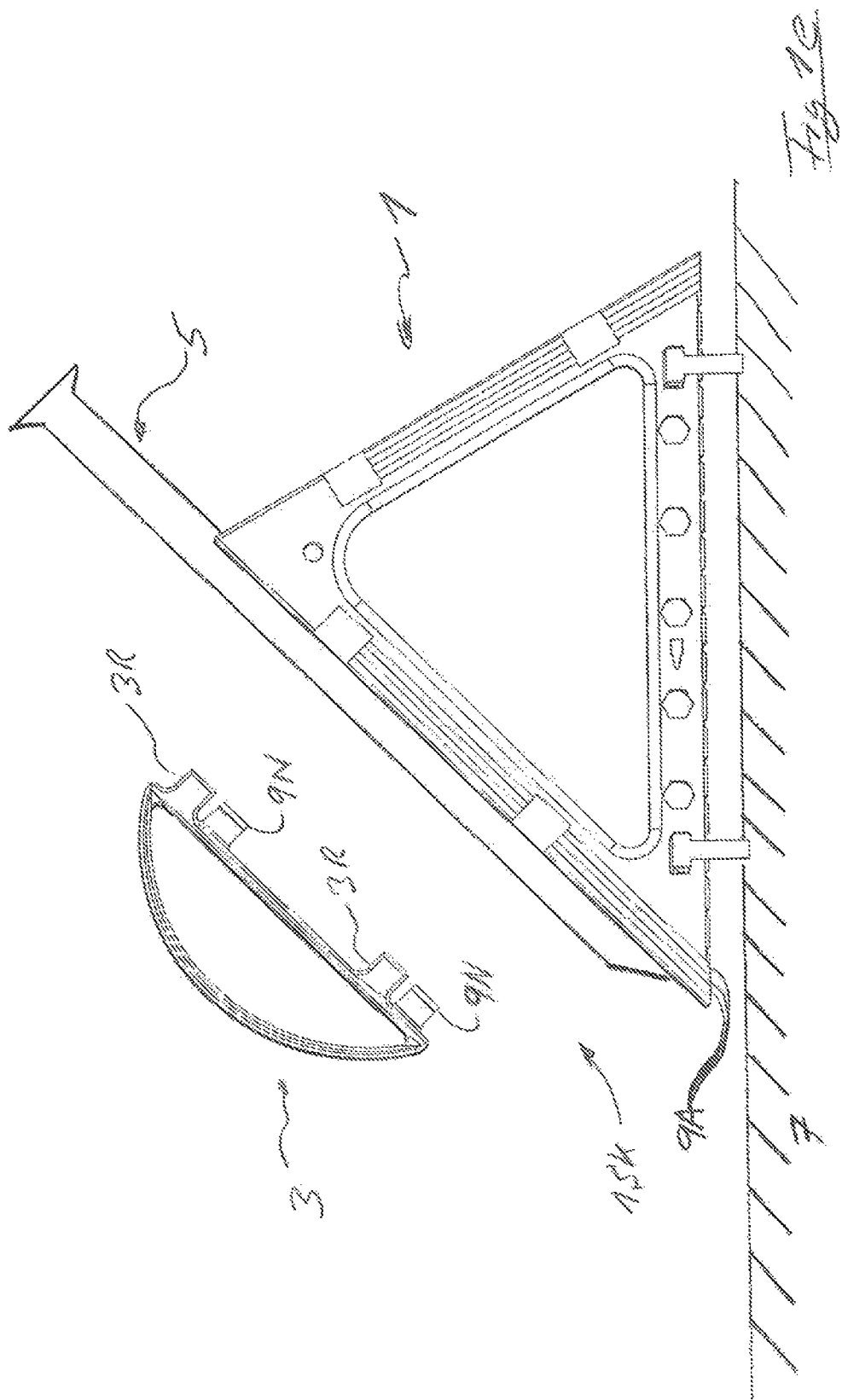

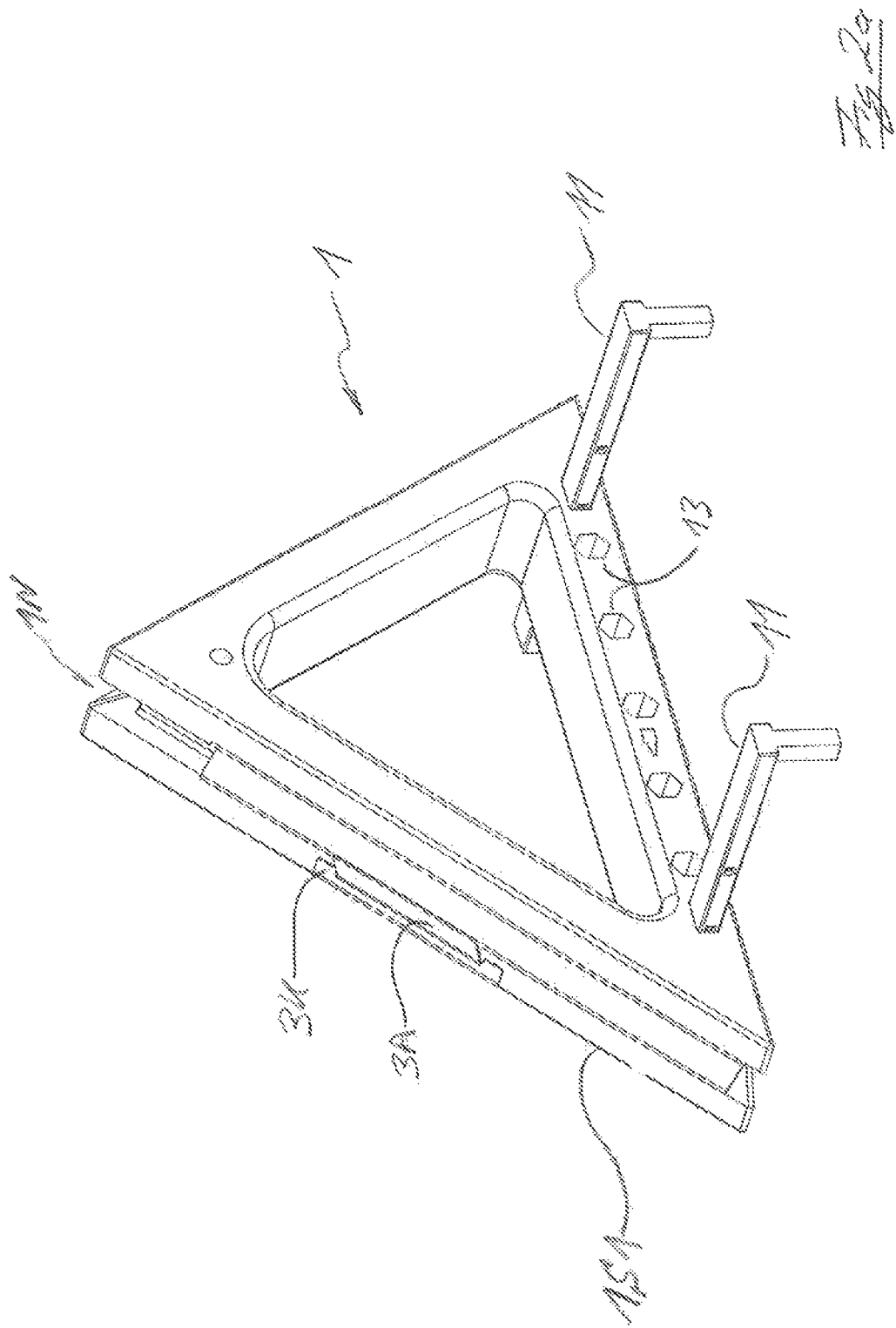

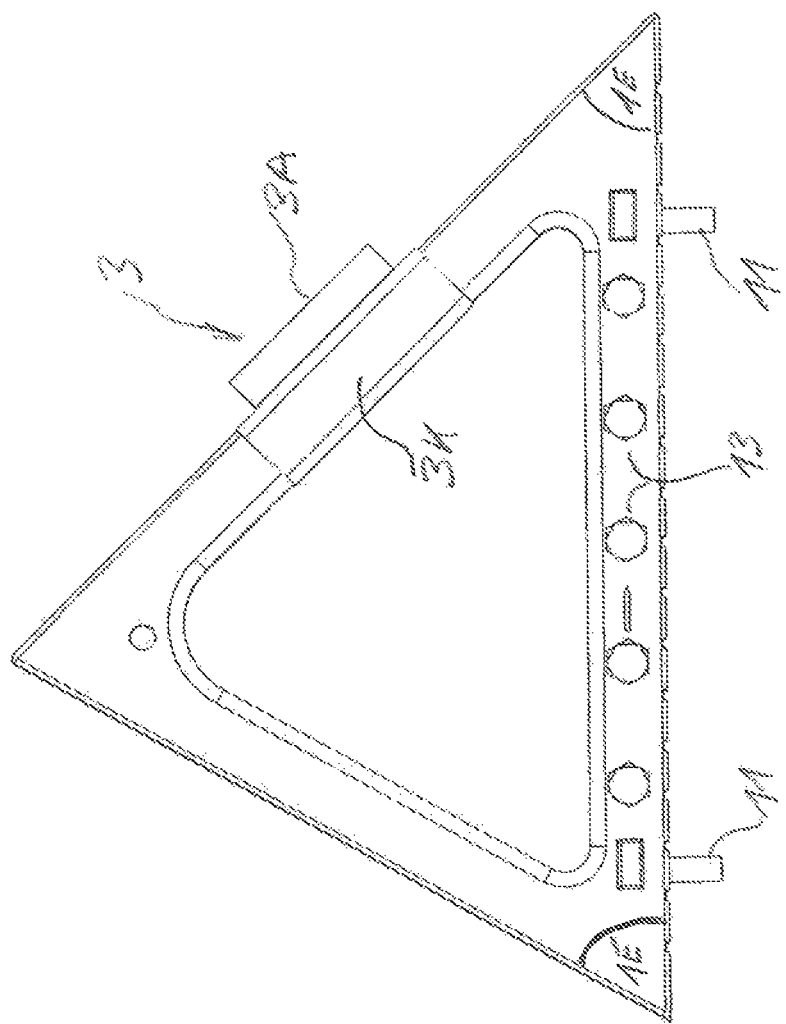

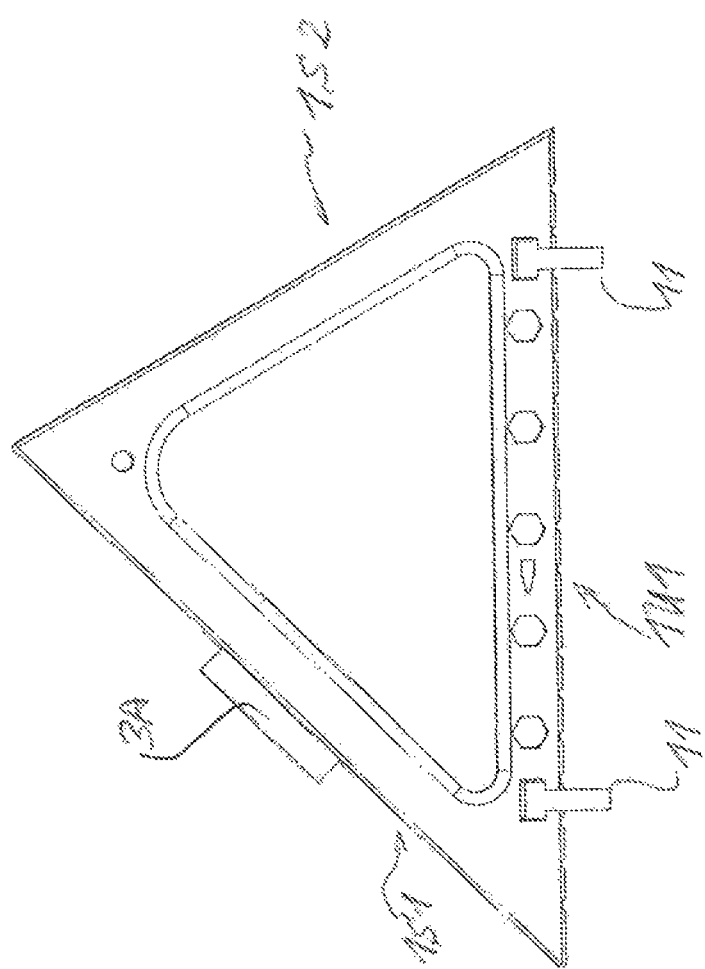

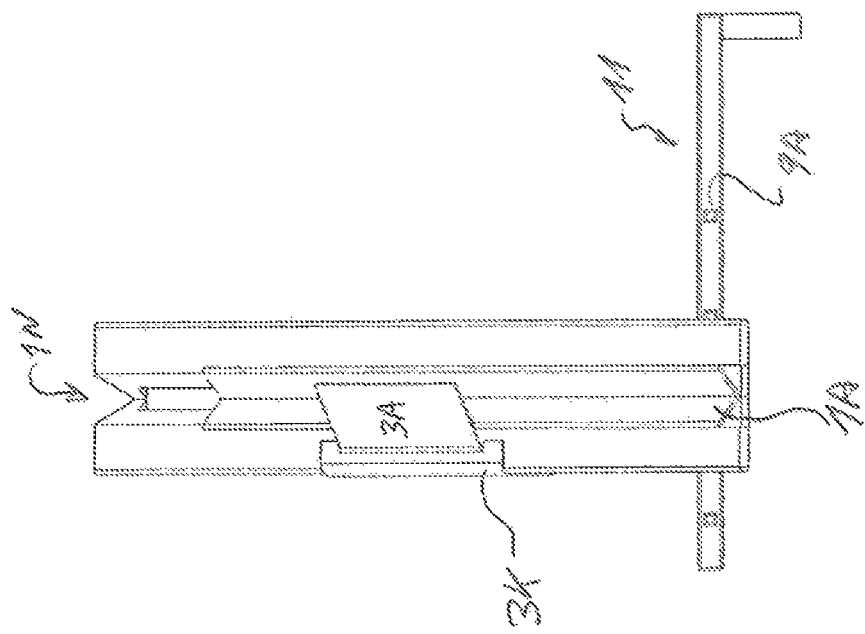

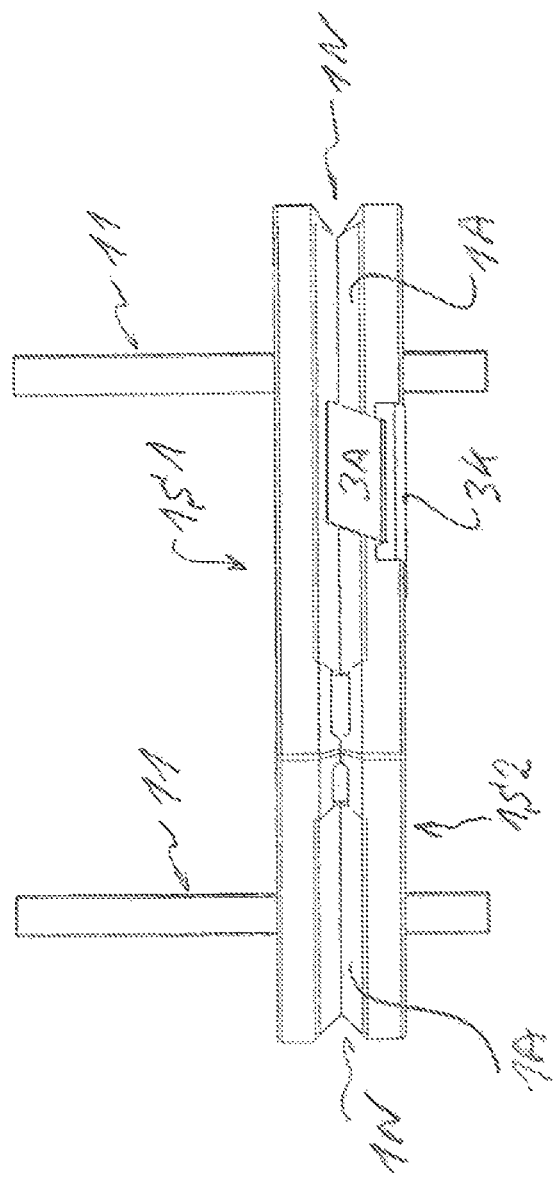

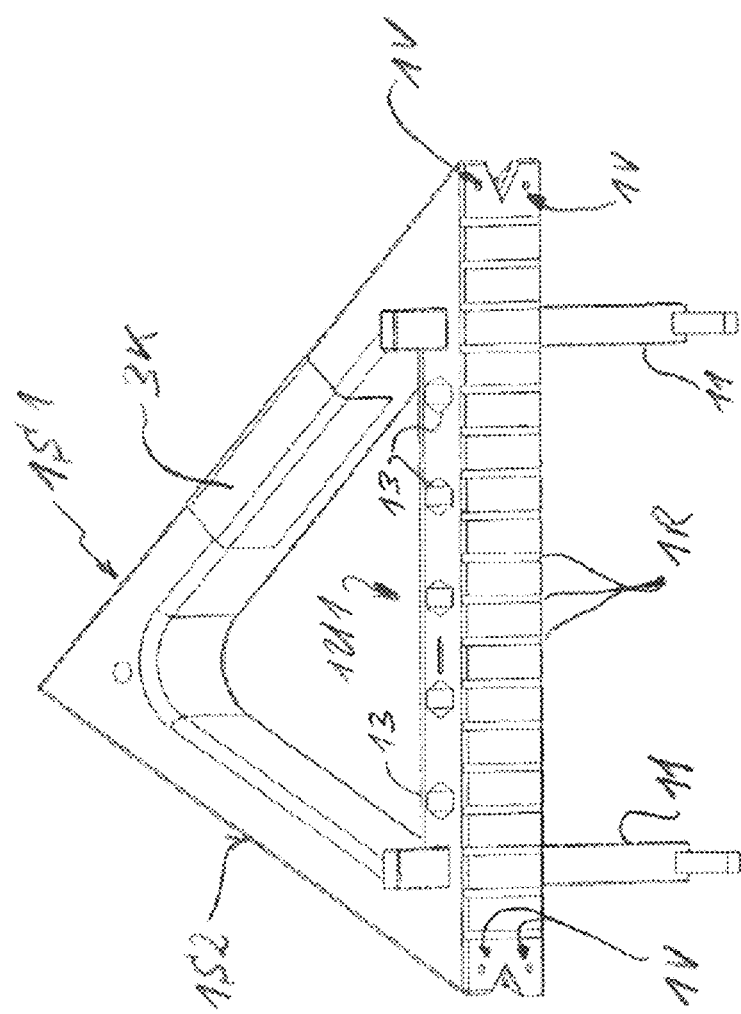

SCREW-IN AID FOR SCREWING IN A LONG SCREW

This application is a U.S. national phase of PCT/EP2020/070513 filed Jul. 21, 2020, which claims priority of German patent application number 10 2019 119 10 845.3 filed Jul. 23, 2019, the disclosure of each of which is hereby incorporated herein by reference.

TECHNICAL FIELD

Embodiments of the invention relate to a screw-in aid for screwing a long screw in a defined screw-in angle into an underground, with at least one ground engaging portion for placing on the underground and at least one screw placing portion for placing the screw on it, wherein the screw-in angle is formed between them.

TECHNOLOGICAL BACKGROUND

From DE 10 2017 119 820 DE, a triangular screw-in aid is known. The three sides substantially form a right-angled triangle, in which the hypotenuse is configured for placing a screw. The hypotenuse comprises a bending in the region of the center, such that screws may be screwed in wood under two different angles. A cathetus of the triangle serves as handle. The other cathetus serves for placing on the wood.

It is disadvantageous, that the screw, when screwing with such a screw-in aid, easily slips out of the same, for example when the user does not hold it exactly in the screw-in-direction when screwing in the screw with an electric screwdriver. Frequently, a small wobble is sufficient, to let the screw slip out of the screw-in aid. Furthermore, the screw-in aid only has a small range of functions when considering the operation stages which are necessary in the course of screwing a long screw into wood with a certain screw-in angle, for example keeping different bits available for screwing, or to adjust the distance to an adjacent object.

SUMMARY OF THE INVENTION

Therefore, there may be a need to provide a screw-in aid which enables safely screwing the screw and preferably also has a larger range of functions.

According to embodiments of the invention, a screw-in aid with the features of claim 1 is provided.

Preferably, the screw comprises a length of more than 10 cm, in particular more than 15 cm, and preferred more than 20 cm. For shorter and/or short screws, a screw-in aid is usually not necessary, since usually they may be sufficiently guided by hand, i.e. without a screw-in aid. However, especially in wood construction, for example roof construction, screwing in long screws in a certain angle is required, to ensure specific load values of the wood beams to be connected.

Preferably, the underground consists of or encompasses: wood, chipboard, MDF, plastic. The underground may be present for example in form of slats, beams, in particular roof beams, laminated timber, cross laminated timber, laminated veneer lumber, or plates.

Advantageously, the screw placing portion and/or the screw holder comprise a groove for receiving the screw in it. Thereby, a good guidance of the screw at the screw-in aid and/or the screw holder is enabled.

In an advantageous embodiment, the screw holder is latchable with the screw placing portion by engaging latching units, for example latching lugs and latching lug receptions and/or from an end of the same is displaceable on it, for example guiding lugs of the screw holder are displaceable in guiding rails of the screw placing portion.

Preferably, a second screw placing portion is provided which reaches from the free end of the ground engaging portion to the free end of the screw placing portion, such that they form a triangle. By this configuration, the screw-in aid provides two screw-in angles in a simple manner.

In a further embodiment, a second screw placing portion and a second ground engaging portion may be provided, wherein the four portions form a quadrangle and the ground engaging portions and the screw placing portions are opposing each other, wherein between the respective portions, respectively different angles may be formed.

Advantageously, the screw-in aid and/or the screw holder, in particular integrally, consist of plastic.

Advantageously, the screw-in angle is between 20 to 90°, in particular 30 to 75°.

Preferably, at least one spacer is displaceably guided in the ground engaging portion, in particular with a right angle to it, to adjust a desired distance of the screw-in aid to an adjacent object, for example an adjacent wood beam.

Advantageously, two spacers are provided which are in particular arranged at opposing ends of the ground engaging portion.

Preferably, a side of the screw placing portion which is facing the screw comprises at least in portions a hard surface or a hard support (German: Auflage), to protect the screw placing portion against abrasion by the screw when screwing in the same, for example by the side of the screw placing portion which is facing the screw being made of a harder plastic, in particular made of a harder plastic than the rest of the screw-in aid, and/or comprising a support made of a hard material, for example made of a hard plastic or a metal, for example spring steel or steel.

Advantageously, the at least one screw placing portion comprises at least one magnet, to hold the screw at the screw placing portion, for example until the screw holder is arranged at the screw-in aid.

Preferably, in the ground engaging portion and/or the at least one screw placing portion, at least one insertion opening for a bit is formed, to hold at least one bit directly at the screw-in aid for using with a (electric) screwdriver.

Advantageously, the ground engaging portion comprises short and/or thin protrusions, for example pins or channels, made of metal or plastic, to avoid a slipping of the screw-in aid on the underground in use. When they are in a specific distance with respect to each other, for example 1 cm, they may also serve as marking aid or for drawing.

In a first embodiment, the screw holder encompasses at the at least one screw placing portion a, in particular longitudinally displaceable, clip, at which a covering plate is pivotably mounted, preferably biased by a spring, such that it is pivoted away from the screw placing portion, to enable in this open state the placement of a screw at the screw placing portion, and in a closed state, when the covering plate abuts against the screw placing portion, to form the closed screwing channel. In this embodiment, the screw may be placed on the screw placing portion and then the covering plate may be pivoted in the direction of the screw placing portion by hand, to form an at least partially closed screwing channel for guiding the screw. Thus, the closed screwing channel is formed by the screw placing portion and the covering plate. The advantageously arranged spring keeps the covering plate away from the screw placing portion, such that, at each time, a screw may be placed on the screw placing portion. The screw placing portion and/or the covering plate may comprise grooves, in which the screw may be inserted.

In a second embodiment, the screw holder encompasses a planar basis as base plate for abutting against the screw placing portion and for forming the screwing channel. From the basis, at the one side, a semicircular grab handle extends, to handle the screw holder and possibly at the same time the screw-in aid which is connected with it. From the other side, four latching feet with latching lugs extend, to latch these with guiding rails of the screw placing portion. Under spreading the latching feet outwardly perpendicularly with respect to the screw placing portion, the screw holder may be displaced on it, to latch the latching lugs with the guiding rails. The screw holder may also be displaced from an end of the screw placing portion along its extension on the same, wherein the latching lugs engage in the guiding rails. When multiple guiding rails are arranged in parallel with respect to each other, the screw holder—depending on a diameter of the screws—may be latched in a differently deep manner with the screw-in aid.

Thus, in this embodiment, the screwing channel is formed by one side of the basis and base plate, respectively, and the screw placing portion. For forming and/or opening the screwing channel, the screw holder is connected with the screw-in aid and they are detached from each other, respectively. Advantageously, in the basis and/or the screwing channel, a groove may be formed, to receive the screw in it.

DETAILED DESCRIPTION OF EXEMPLARY EMBODIMENTS

Further features, details, and advantages of embodiments of the invention become apparent from the claims and the subsequent description of preferred embodiments and by means of the drawing. It is shown by:

FIG. 1 a) a first perspective, b) a second perspective, c) a third perspective, d) a first side-, and e) a second side view of the screw-in aid with a screw holder in a first embodiment according to embodiments of the invention, FIG. 2 a) a first perspective view, b) a first side view, c) a second side view, d) a third side view, e) a plan view, and f) a second perspective view of a screw-in aid with a screw holder in a second embodiment according to embodiments of the invention, and FIG. 3 a) a third and b) a fourth embodiment in a schematic view.

FIG. 1 shows the different views of a screw-in aid 1 with a screw holder 3 according to embodiments of the invention.

The screw-in aid 1 comprises a triangular shape, wherein the longest side of the triangle forms an ground engaging portion 1U1 for placing on an underground 7 and the both other sides form screw placing portions 1S1, 1S2 for placing screws 5.

The ground engaging portion 1U1 comprises a row of insertion openings 13 for bits. Perpendicularly to the longitudinal extension of the ground engaging section 1U1, two spacers 11 are displaceably guided in the ground engaging portion 1U1. Both spacers 11 comprise latching receptions 9A for not illustrated latching lugs which are arranged in the ground engaging portion 1U1. The latching receptions are arranged with a regular distance with respect to each other and may thus be displaced relatively to the ground engaging portion 1U1 to a defined extent. Both spacers 11 comprise at one end a bending of 90°, whereby a foot for placing on an arbitrary object is formed. By means of both spacers 11, the screw-in aid 1 may be arranged with a defined distance to another object. For example, in the roof construction, when two beams shall be arranged with a defined distance with respect to each other, or screws shall be screwed in with a defined distance to another object, this distance may be adjusted via the spacers 11. Both spacers 11 are arranged at opposing ends of the ground engaging portion 1U1, to arrange the screw-in aid 1 as stable as possible over the spacers 11 relatively to another object.

The bottom side of the ground engaging portion 1U1 can best be taken from FIG. 2f which in fact relates to a further embodiment of the screw-in aid 1, wherein nevertheless the bottom side of the ground engaging portion 1U1 is identically constructed as the present embodiment. Perpendicularly to the ground engaging portion 1U1, multiple channels 1R are arranged in parallel with respect to each other, to counteract a slipping of the screw-in aid 1 on an underground 7. Furthermore, the bottom side comprises multiple tip-shaped protrusions 1V, to counteract a slipping of the screw-in aid 1 on the underground 7.

Screw placing portions 1S1, 1S2 are arranged with different angles to the ground engaging portion 1U1: the shortest portion is arranged with an angle of 45° and the longer portion with an angle of 60° to the ground engaging portion 1U1. Besides, both portions are identically constructed.

In the extension direction of both screw placing portions 1S1, 1S2, respectively a groove 1N is centrally arranged for receiving a screw 5 in it. The groove 1N substantially comprises a V-shape in the cross section. A support 1A for screws 5 is arranged in both grooves 1N, which consists of a spring steel and is fixedly latched with the respective screw placing portion 1S1. When screwing the screw, the support 1A protects the screw placing portion 1S1 against friction which would damage the screw placing portion 1S1.

At opposing sides of each screw placing portion 1S1, 1S2, guiding rails 9A are arranged in parallel with respect to each other. In the center and at the end of the guiding rails 9A, on both opposing sides, respectively one insertion area 9E is formed. The insertion areas 9E serve for inserting latching feet 3R of the screw holder 3, as described below.

The screw-in aid 1 is integrally made of plastic. The supports 1A consist of spring steel and are latched in the respective groove 1N. The spacers 11 are also integrally made of plastic. Alternatively, the screw-in aid 1 is composed of two halves (centrally divided in the longitudinal direction of the same) and then assembled.

The screw holder 3 comprises a basis 3B which comprises a rectangular shape. To the one side of the basis 3B, a semicircular grab handle 3H extends, to handle the screw holder 3H (and the screw-in aid 1 which is possibly latched with it). To the other side, four latching feet 3R extend, at whose free end latching lugs 9N are formed, to latch these in the guiding rails 9A of the screw placing portion 1S1, 1S2. The screw holder 3 is integrally made of plastic.

There are two possibilities to connect the screw holder 3 with the screw-in aid 1. The first possibility is to displace the screw holder 3 from the in FIG. 1a) lower end of the screw placing portion 1S1 onto the screw placing portion 1S1. A second possibility is to displace the screw holder 3 perpendicularly to the screw placing portion 1S1, such that the latching feet 3R engage in the insertion areas 9E. In the following, the screw holder 3 may be moved downwardly in the orientation of FIG. 1a, so that the latching lugs 9N of the latching feet 3R engage in the guiding rails 9A of the respective screw placing portion 1S1, 1S2 again. When the screw holder 3 is connected with the screw-in aid 1, a screwing channel 1SK is formed between them, in which a screw 5 may be guided during screwing. The screwing channel 1SK is circumferentially closed, such that the screw 5 cannot escape from it 1SK.

By the multiple guiding rails 9A of the screw placing portions 1S1, 1S2 which are arranged in parallel, the screw holder 3 may be arranged in different distances with respect to the screw-in aid 1. Therefore, screwing channels with different dimensions may be formed, so that the screwing channel 1SK may be adapted to the respectively present diameter of a screw 5 to be screwed in. When the screw 5 comprises a small diameter, the screw holder 3 may be latched narrowly or near to the screw-in aid 1, i.e. with guiding rails 9A of the screw placing portion 1S1 which are arranged on the right-hand side in FIG. 1*a*). When the screw 5 comprises a large diameter, the screw holder 3 may be latched with a larger distance from the screw-in aid 1, i.e. with the guiding rails 9A of the screw placing portion 1S1 which are arranged at the left-hand side in FIG. 1*a*).

Example for the use of the screw-in aid 1 with the screw holder 3: the screw-in aid 1 is arranged with its ground engaging portion 1U1 on a wood beam as underground 7 of a roof truss, see FIG. 1*e*). By means of the spacers 11, a distance to an adjacent wood beam of the roof truss is adjusted. A wood screw 5 is arranged in the groove 1N of the screw placing portion 1S1, wherein the tip of the screw 5 is arranged at the position of the wood beam where it shall be screwed in. In the following, the screw holder 3 is latched with the screw-in aid 1, to form a screwing channel 1SK. The screw holder 3 is arranged as close as possible to the screw-in aid 1, to form a possibly narrow screwing channel 1SK. Subsequently, the screw 5 is screwed into the wood beam by means of an electric screwdriver, wherein the screw 5 slides along the screw placing portion 1S1 when screwing in. When the screw 5 is arranged sufficiently deep in the wood beam, so that it has found its direction, the screw holder 3 may be detached from the screw-in aid 1 and both are removed from the screw 5. Subsequently, the screw-in processes is continued, until the screw 5 is countersunk in the wood beam to the desired extent.

FIG. 2 shows, in different views, a further embodiment of the screw-in aid 1 with the screw holder 3, wherein in the following only the differences are explained. At the, in FIG. 2*a* left, screw placing portion 1S1, a clip 3K is arranged which is displaced on the screw placing portion 1S1 and is latched with it. The clip 3K consists of spring steel and comprises in the cross-section substantially a U-shape. At the clip 3K, a covering plate 3A is hinged, which pushes by means of a spring (not illustrated) the covering plate 3A in the position shown in FIG. 2*a*, wherein the covering plate 3A is pivoted away from the screw placing portion 1S1. The position which is shown in FIG. 2*a* is the open position, wherein a screw 5 may be inserted in the groove 1N of the screw placing portion 1S1. When a screw 5 is arranged in the groove 1N, the screw placing portion 1S1 may be grasped by hand, such that the covering plate 3A pivots in the direction on the screw placing portion 1S1 and pushes the screw 5 into the groove 1N. This is the closed position of the covering plate 3A, in which the screw 5 may be screwed, for example into a wood beam.

The use of the screw-in aid 1 with the screw holder 3 is thus performed as described in the following: the screw-in aid 1 is arranged on a wood beam and by the spacers 11, a desired distance is adjusted. A screw 5 is placed in the groove 1N of a screw placing portion 1S1. A hand grasps the clip 3K and the covering plate 3A, whereby the screw 5 is pushed into the groove 1N by the covering plate 3A. By the electric screwdriver, the screw 5 is screwed into the wood beam. When the screw 5 is screwed in sufficiently far, the hand may be taken from the screw placing portion 1S1, 1S2, whereby the covering plate 3A moves in its open position of FIG. 2*a* again. Now, the screw-in aid 1 may be removed from the screw and the screw 5 may be further screwed in.

FIG. 3*a* schematically shows a third embodiment of the invention. Deviating from both above described embodiments, a screw placing portion 1S2 is removed, so that the screw-in aid 1 comprises only one ground engaging portion 1U1 and one screw placing portion 1S1, i.e. the screw placing portion 1S1 was simply cut out. The screw-in aid 1 of FIG. 3*a* is thus only an angle which is spanned by the ground engaging portion 1U1 and the screw placing portion 1S1. The screw-in aid of FIG. 3*a* may comprise both a screw holder 3 according to FIG. 1 and a screw holder 3 according to FIG. 2.

Figure 3B:
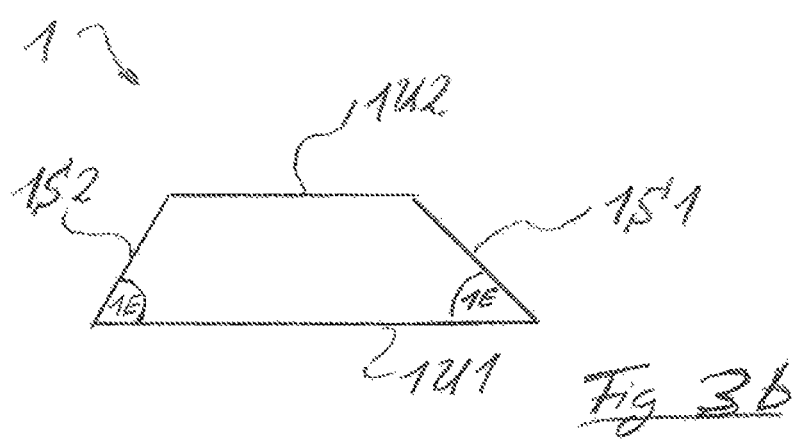

The screw holder of FIG. 3*b* comprises two opposing ground engaging portions 1U1, 1U2 and two opposing screw placing portions 1S1, 1S2 which respectively comprise different screw-in angles 1E between them. In this embodiment, it is advantageously, that a long ground engaging portion 1U2 may be formed which enables a good handling and grasping of the screw-in aid 1.

LIST OF REFERENCE SIGNS 1 screw-in aid
1A support for screws
1E screw-in angle
1N groove for receiving screws
1R channel to avoid a slipping of the screw-in aid on the underground
1S1 (first) screw placing portion for placing on a screw
1S2 (second) screw placing portion for placing on a screw
1SK screwing channel
1U1 (first) ground engaging portion for placing on the underground
1U2 (second) ground engaging portion for placing on the underground
1V protrusion to avoid a slipping of the screw-in aid on the underground
3 screw holder
3A covering plate
3B basis
3H grab handle (semi-circle)
3K clip
3R latching foot
5 screw
7 ground engaging
9A latching lug receptions and guiding rails, respectively
9E insertion area
9N latching lugs and guiding lugs, respectively
11 spacer
13 insertion opening for a bit

The invention claimed is:

1. Screw-in aid for screwing a long screw in a defined screw-in angle into an underground having at least one ground engaging portion for placing on the underground and at least one screw placing portion for placing the screw therein, wherein the screw-in angle is formed between the screw placing portion and the ground engaging portion, wherein at the screw placing portion, a screw holder is arranged which forms a screwing channel for the screw, to guide the screw when screwing into the underground;

wherein the screw-in aid forms a closed polygon;
wherein the screw holder encompasses, at the at least one screw placing portion, a longitudinally displaceable spring clip comprising a substantially U-shaped cross-section for securing the screw holder to the screw-in aid, wherein a covering plate is pivotably mounted on the clip, such that the covering plate is configured to be pivoted away from the screw placing portion, to enable in this open state the placement of a screw at the screw placing portion, or pivoted toward the screw placing portion in a closed state, when the covering plate abuts against the screw placing portion, to form a closed screwing channel between the screw placing portion and the covering plate.

2. Screw-in aid according to claim 1, wherein the screw placing portion comprises a groove for receiving the screw.

3. Screw-in aid according to claim 1, comprising a second screw placing portion which extends from the free end of the ground engaging portion to the free end of the screw placing portion, such that they form a triangle.

4. Screw-in aid according to claim 1,
comprising a second screw placing portion and a second ground engaging portion, wherein the four portions form a quadrangle and the ground engaging portions and the screw placing portions are opposing each other, wherein between the respective portions respectively different angles are formed.

5. Screw-in aid according to claim 1, wherein the screw-in aid and/or the screw holder consist of plastic.

6. Screw-in aid according to claim 1, wherein the screw-in angle is between 20 to 90°.

7. Screw-in aid according to claim 1, comprising two spacers which are arranged at opposing ends of the ground engaging portion.

8. Screw-in aid according to claim 1, wherein a side of the screw placing portion which is facing the screw comprises at least in portions a hard surface or a hard support, to protect the screw placing portion against abrasion by the screw when screwing in the same.

9. Screw-in aid according to claim 1, wherein in the ground engaging portion and/or the at least one screw placing portion at least one insertion opening for a bit is formed, to hold at least one bit directly at the screw-in aid for a use with a screwdriver.

10. Screw-in aid according to claim 1, wherein the ground engaging portion comprises short and/or thin protrusions to avoid a slipping of the screw-in aid on the underground in use.

* * * * *